United States Patent
Yang et al.

(10) Patent No.: US 9,903,250 B2
(45) Date of Patent: Feb. 27, 2018

(54) RECIRCULATING EXHAUST TREATMENT FLUID SYSTEM

(71) Applicant: Tenneco Automotive Operating Company Inc., Lake Forest, IL (US)

(72) Inventors: Jianyuan Yang, Northville, MI (US); Guru Kaustubh Vilas Teggi, Canton, MI (US); Ryan A. Floyd, Mason, MI (US); Bruce Kring, Mason, MI (US); Brian Kunkel, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 847 days.

(21) Appl. No.: 14/271,811

(22) Filed: May 7, 2014

(65) Prior Publication Data
US 2014/0331650 A1    Nov. 13, 2014

Related U.S. Application Data

(60) Provisional application No. 61/820,216, filed on May 7, 2013.

(51) Int. Cl.
*F01N 3/00* (2006.01)
*F01N 11/00* (2006.01)
(Continued)

(52) U.S. Cl.
CPC .......... *F01N 11/00* (2013.01); *B01D 53/9495* (2013.01); *F01N 3/2066* (2013.01); *G01F 23/296* (2013.01); *G01F 23/2961* (2013.01); *F01N 2550/05* (2013.01); *F01N 2610/02* (2013.01); *F01N 2610/1406* (2013.01); *F01N 2610/148* (2013.01); *F01N 2900/0422* (2013.01); *F01N 2900/1811* (2013.01);
(Continued)

(58) Field of Classification Search
CPC .......... F01N 11/00; F01N 3/2066; F01N 3/20; F01N 3/18; F01N 2610/02; F01N 2610/148; F01N 2550/05; F01N 2900/0422; F01N 2900/1811; F01N 2900/1814; G01F 23/296; G01F 23/2961; B01D 53/9495; Y02T 10/24; Y02T 10/47
USPC ...... 6/285, 286, 295, 296, 299; 60/285, 286, 60/295, 296, 299
See application file for complete search history.

(56) References Cited

U.S. PATENT DOCUMENTS

| | | | |
|---|---|---|---|
| 4,300,924 A * | 11/1981 | Coyle | ............... F01N 3/04 261/123 |
| 6,063,350 A | 5/2000 | Tarabulski et al. | |

(Continued)

FOREIGN PATENT DOCUMENTS

| | | | | |
|---|---|---|---|---|
| CN | 102853877 A | 1/2013 | | |
| DE | 102012004269 A1 * | 9/2013 | ........... | F01N 3/2066 |

(Continued)

*Primary Examiner* — Jason Shanske
*Assistant Examiner* — Kelsey Stanek
(74) *Attorney, Agent, or Firm* — Harness, Dickey & Pierce, P.L.C.

(57) ABSTRACT

An exhaust treatment fluid system includes a tank housing for storing an exhaust treatment fluid. A suction tube includes a first end positioned within the housing. A first sensor is positioned within the tank housing for determining at least one of a fluid level and a concentration of the exhaust treatment fluid. A skirt is positioned in the tank to peripherally surround the first sensor.

31 Claims, 10 Drawing Sheets

(51) Int. Cl.
  *G01F 23/296* (2006.01)
  *B01D 53/94* (2006.01)
  *F01N 3/20* (2006.01)

(52) U.S. Cl.
  CPC ....... *F01N 2900/1814* (2013.01); *Y02T 10/24* (2013.01); *Y02T 10/47* (2013.01)

(56) References Cited

U.S. PATENT DOCUMENTS

| | | | |
|---|---|---|---|
| 6,314,942 B1 * | 11/2001 | Kilgore | F02M 55/025 |
| | | | 123/467 |
| 6,729,316 B1 | 5/2004 | Knowles | |
| 7,647,767 B2 * | 1/2010 | Osaku | F01N 3/2066 |
| | | | 60/286 |
| 7,960,852 B2 | 6/2011 | Cumings et al. | |
| 2003/0033799 A1 | 2/2003 | Scheying | |
| 2008/0205478 A1 | 8/2008 | Sasanuma et al. | |
| 2010/0050606 A1 | 3/2010 | Fulks et al. | |
| 2010/0212290 A1 | 8/2010 | Thiagarajan et al. | |
| 2011/0166802 A1 | 7/2011 | Kong et al. | |
| 2011/0232271 A1 | 9/2011 | Haeberer | |
| 2014/0227138 A1 | 8/2014 | Okamoto et al. | |
| 2014/0283933 A1 | 9/2014 | Andvik et al. | |
| 2014/0366512 A1 * | 12/2014 | Hodgson | F01N 3/2066 |
| | | | 60/286 |

FOREIGN PATENT DOCUMENTS

| | | |
|---|---|---|
| EP | 1908931 A1 | 4/2008 |
| EP | 2848931 A1 | 3/2015 |
| JP | 2005299441 A | 10/2005 |

* cited by examiner

RECIRCULATING EXHAUST TREATMENT FLUID SYSTEM

CROSS-REFERENCE TO RELATED APPLICATIONS

This application claims the benefit of U.S. Provisional Application No. 61/820,216, filed on May 7, 2013. The entire disclosure of the above application is incorporated herein by reference.

FIELD

The present disclosure relates to an exhaust after-treatment system including a reductant sensor system.

BACKGROUND

This section provides background information related to the present disclosure which is not necessarily prior art.

Exhaust after-treatment systems may dose an exhaust treatment fluid into the exhaust stream to assist in chemical reactions that remove NOx from the exhaust stream. The exhaust treatment fluid may be stored in a storage tank that communicates with a dosing module, which doses the exhaust treatment fluid into the exhaust stream. The storage tank may include various sensors for determining a temperature of the fluid level, a fluid level in the tank, and a concentration of the fluid in the tank. When the exhaust treatment fluid is a urea solution, the solution may freeze in cold temperatures. To prevent freezing of the urea solution in the dosing module, the dosing module may be purged and the unused urea solution may be returned to the tank. After being purged, the system generally must be primed before dosing of the urea solution can resume. During the priming process, the urea solution is cycled from the tank, through the dosing module, and back to the tank. The return of the urea solution to the tank may sometimes interfere with operation of the various sensors in the tank.

SUMMARY

This section provides a general summary of the disclosure, and is not a comprehensive disclosure of its full scope or all of its features.

An exhaust treatment fluid system includes a tank housing for storing an exhaust treatment fluid. A suction tube includes a first end positioned within the housing. A first sensor is positioned within the tank housing for determining at least one of a fluid level and a concentration of the exhaust treatment fluid. A skirt is positioned in the tank to peripherally surround the first sensor.

An exhaust treatment fluid system includes a tank housing for storing an exhaust treatment fluid. A suction tube is positioned within the tank. An injector includes an inlet in fluid communication with the suction tube and an outlet. A return line fluidly interconnects the outlet from the injector and the tank. A sensor is positioned in the tank housing for determining at least one of a fluid level and a concentration of the exhaust fluid. A skirt is positioned in the tank extending around the sensor to define a zone of exhaust treatment fluid that is shielded from another zone of exhaust treatment fluid within the tank housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
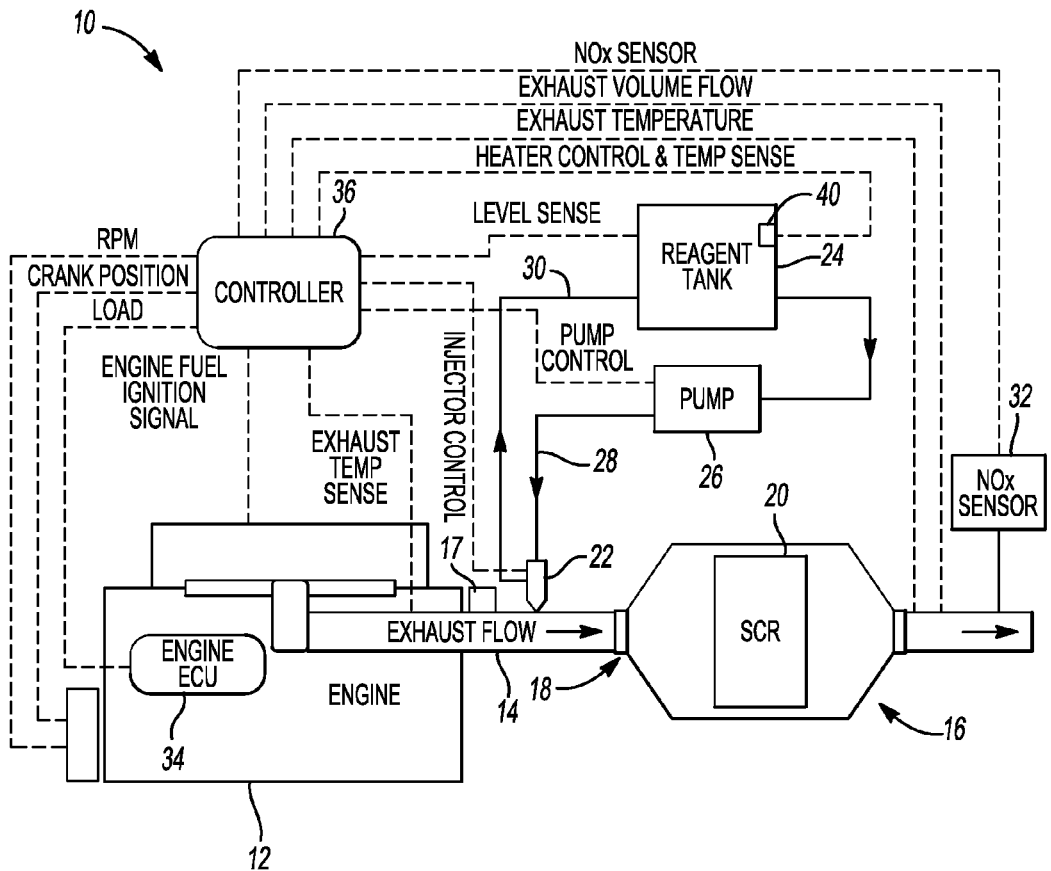
FIG. 1 is a schematic representation of an exhaust system according to a principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed an exhaust treatment component 18, which can be a DOC, a DPF component or, as illustrated, a SCR component 20. Although not required by the present disclosure, exhaust after-treatment system 16 can further include components such as a thermal enhancement device or burner 17 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 includes an injector having an inlet in fluid communication with a reagent tank 24 and a pump 26 by way of inlet line 28 to dose an exhaust treatment fluid such as diesel fuel or urea into the exhaust passage 14 upstream of exhaust treatment component 18. The injector of dosing module 22 may also include an outlet in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling the injector of dosing module 22 so that dosing module 22 does not overheat. Dosing modules 22 may be configured to include a cooling jacket that passes a coolant around dosing module 22 to cool it.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure.

The amount of exhaust treatment fluid required to effectively treat the exhaust stream may also vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from SCR 20. $NO_x$ sensor 32 is operable to output a signal indicative of the exhaust $NO_x$ content to an engine control unit 34. All or some of the engine operating parameters may be supplied from engine control unit (ECU) 34 via the engine/vehicle databus to an exhaust after-treatment system controller 36. The controller 36 could also be included as part of the engine control unit 34. Exhaust gas temperature, exhaust gas flow and exhaust back pressure and other vehicle operating parameters may be measured by respective sensors, as indicated in FIG. 1.

Figure 2:
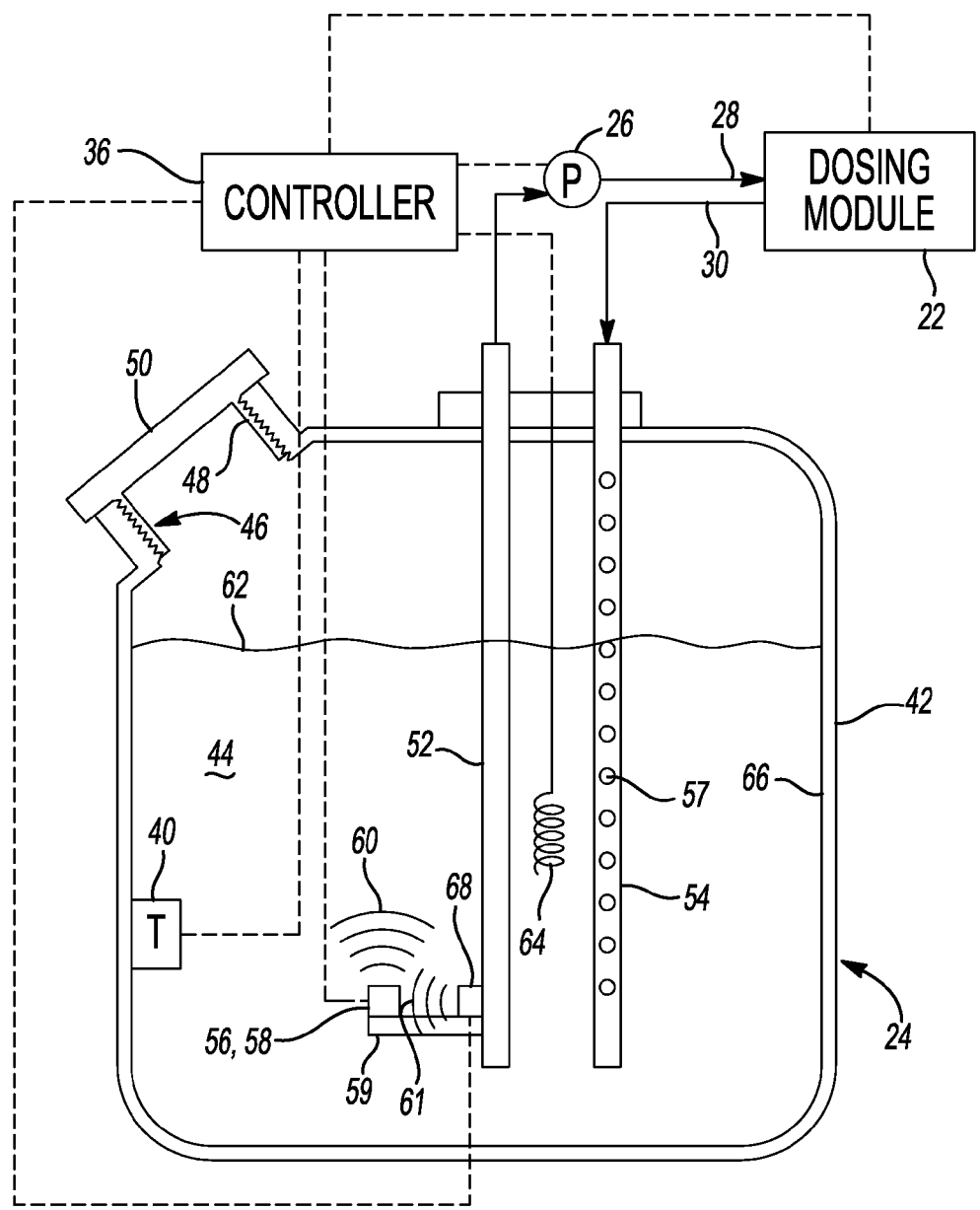
FIG. 2 is a cross-sectional view of a reagent tank according to a principle of the present disclosure.

A temperature of the exhaust treatment fluid may also be a parameter monitored by exhaust after-treatment system controller 36. To monitor a temperature of the exhaust treatment fluid, reagent tank 24 may include a temperature sensor 40 located therein. As best shown in FIG. 2, reagent tank 24 can include a tank housing 42. Tank housing 42 may be formed of materials such as polyethylene, polypropylene, polystyrene, aluminum, steel, or any other type of material suitable for storing a reagent exhaust treatment fluid 44 such as urea. To re-fill tank 24 with an exhaust treatment fluid, tank 24 may include an inlet 46 defined by a threaded neck 48 that may receive a removable cap 50 having a threading that corresponds to that of neck 48, as is known in the art.

Within tank housing 42 can be a pair of suction and discharge tubes 52 and 54, respectively. Suction tube 52 communicates with pump 26 downstream such that when pump 26 is activated, the urea exhaust treatment fluid 44 is drawn from tank 24 into inlet line 28. As noted above, inlet line 28 communicates with dosing module 22 to provide urea exhaust treatment fluid to the exhaust stream. If the urea exhaust treatment fluid 44 is not dosed into the exhaust stream, the urea exhaust treatment fluid 44 may travel back to tank 24 through return line 30. Return line 30 communicates with discharge tube 54. Each of suction tube 52 and discharge tube 54 may be secured within tank 24 using a bulkhead or mounting plate 55 that may sit atop tank 24. The bulkhead may sealingly engage a single opening (not shown) extending through tank housing 42.

To monitor an amount of urea exhaust treatment fluid 44 in tank 24, a fluid level indicating device 56 may be coupled to discharge tube 54. In the illustrated embodiment, fluid level indicating device 56 may comprise an ultrasonic sensor device 58 that emits ultrasonic waves 60. Ultrasonic sensor device 58 may be positioned on a support member 59 that is coupled to suction tube 52. Ultrasonic waves 60 may be emitted by ultrasonic sensor device 58 towards a surface 62 of the exhaust treatment fluid 44, which are then reflected by surface 62 back toward ultrasonic sensor device 58. The time it takes ultrasonic waves 60 to reflect off surface 62 and return to ultrasonic sensor device 58 can be measured by controller 36 to determine an amount of fluid 44 remaining in tank 24. In this regard, ultrasonic sensor device 58 communicates with controller 36.

An exhaust treatment fluid heater 64 may also be positioned in tank 24. Fluid heater 64 is designed to raise a temperature of the exhaust treatment fluid 44, particularly in cold-weather conditions where the exhaust treatment fluid 44 can freeze. Fluid heater 64 may be a resistive heater, or may be configured to allow flow of an engine coolant therethrough, without limitation. Fluid heater 64 does not necessarily continuously operate during operation of engine 12. Rather, fluid heater 64 communicates with controller 36 such that fluid heater 64 can be activated as needed. In this regard, a temperature of the exhaust treatment fluid 44 can be transmitted to controller 36 from temperature sensor 40. If the sensed temperature is too low, controller 36 can instruct fluid heater 64 to activate to heat or thaw the exhaust treatment fluid 44.

Temperature sensor 40 may be positioned anywhere within tank 24 satisfactory to properly determine a temperature of the exhaust treatment fluid 44. For example, temperature sensor 40 can be attached to an interior wall 66 of housing 42. Alternatively, temperature sensor 40 may be attached to suction tube 52 or discharge tube 54.

Tank 24 may also include a concentration sensor 68. Concentration sensor 68 may be fixed to interior wall 66, or may be secured to suction tube 52, discharge tube 54, or another structure, without departing from the scope of the present disclosure. Concentration sensor 68 is operable to determine a concentration of the urea exhaust treatment fluid 44, which can be particularly advantageous to determine whether a fluid (e.g., water) other than urea exhaust treatment fluid 44 has been provided to tank 24. If a concentration of the exhaust treatment fluid 44 is determined by controller 36 to be above or below a predetermined value, controller 36 may signal an error flag that prevents dosing by dosing module 22, or prevents engine 12 from operating until a correct concentration of fluid 44 is achieved. Alternatively, controller 36 may adjust the dosing to account for the present concentration.

To determine a concentration of the exhaust treatment fluid 44, concentration sensor 68 may be an ultrasonic sensor that is operable to emit ultrasonic waves 61 into the exhaust treatment fluid. Other types of non-ultrasonic sensors are within the scope of the present disclosure. In the illustrated exemplary embodiment, concentration sensor 68 may be disposed proximate ultrasonic sensor device 58 and may emit ultrasonic waves 61, which may then be reflected off ultrasonic sensor device 58. Alternatively, a reflective member (not shown) may be disposed between concentration sensor 68 and ultrasonic sensor device 58 to reflect ultrasonic waves 61. Another alternative is to have concentration sensor 68 face and emit ultrasonic waves 61 toward interior wall 66 for reflection therefrom. Regardless, based on the velocity of the ultrasonic waves 61, controller 36 may determine a concentration of the exhaust treatment fluid 44. Although fluid level indicating device 56 and concentration sensor 68 are illustrated as being distinct components within tank 24, it should be understood that a single sensor (e.g., ultrasonic sensor device 58) can be used for level-sensing and concentration-sensing without departing from the scope of the present disclosure.

When engine 12 or exhaust after-treatment system 16 are not operating (i.e., no exhaust treatment fluid is being dosed into the exhaust stream), any exhaust treatment fluid 44 present in dosing module 22, inlet line 28, return line 30, and pump 26 can freeze in cold temperatures. To prevent freezing of the exhaust treatment fluid 44 in the dosing module 22, inlet line 28, return line 30, and pump 26, pump 26 is operable to run in reverse to purge each of these elements. After purging, pump 26 may be primed to pressurize the inlet line 28 and dosing module 22 before the exhaust treatment fluid 44 is dosed into the exhaust stream. During priming, the unused exhaust treatment fluid 44 returns from dosing module 22 to tank 24 via the return line 30.

In addition to the unused exhaust treatment fluid 44, air may also be present in the unused exhaust treatment fluid 44 that was previously located within the tank 24. Due to the presence of air in the unused exhaust treatment fluid 44, bubbles may develop as the air is returned to tank 24. These bubbles may then float to surface 62 through perforations 57 formed in discharge tube 54, and remain at surface 62 for a period of time such surface 62 becomes frothy. The bubbles and frothy surface 62 are not conducive to determining a proper fluid level within tank 24 by ultrasonic sensor device 58, or a proper concentration by concentration sensor 68. That is, the bubbles may provide an inaccurate surface level 62 that prevents controller 36 from properly measuring reflections of ultrasonic waves 60 and 61 by ultrasonic sensor device 58. The bubbles may also interfere with concentration sensor 68 in that the bubbles may remain suspended in the exhaust treatment fluid 44 and cause a density change in the exhaust treatment fluid 44 that is being monitored by concentration sensor 68.

Figure 3:
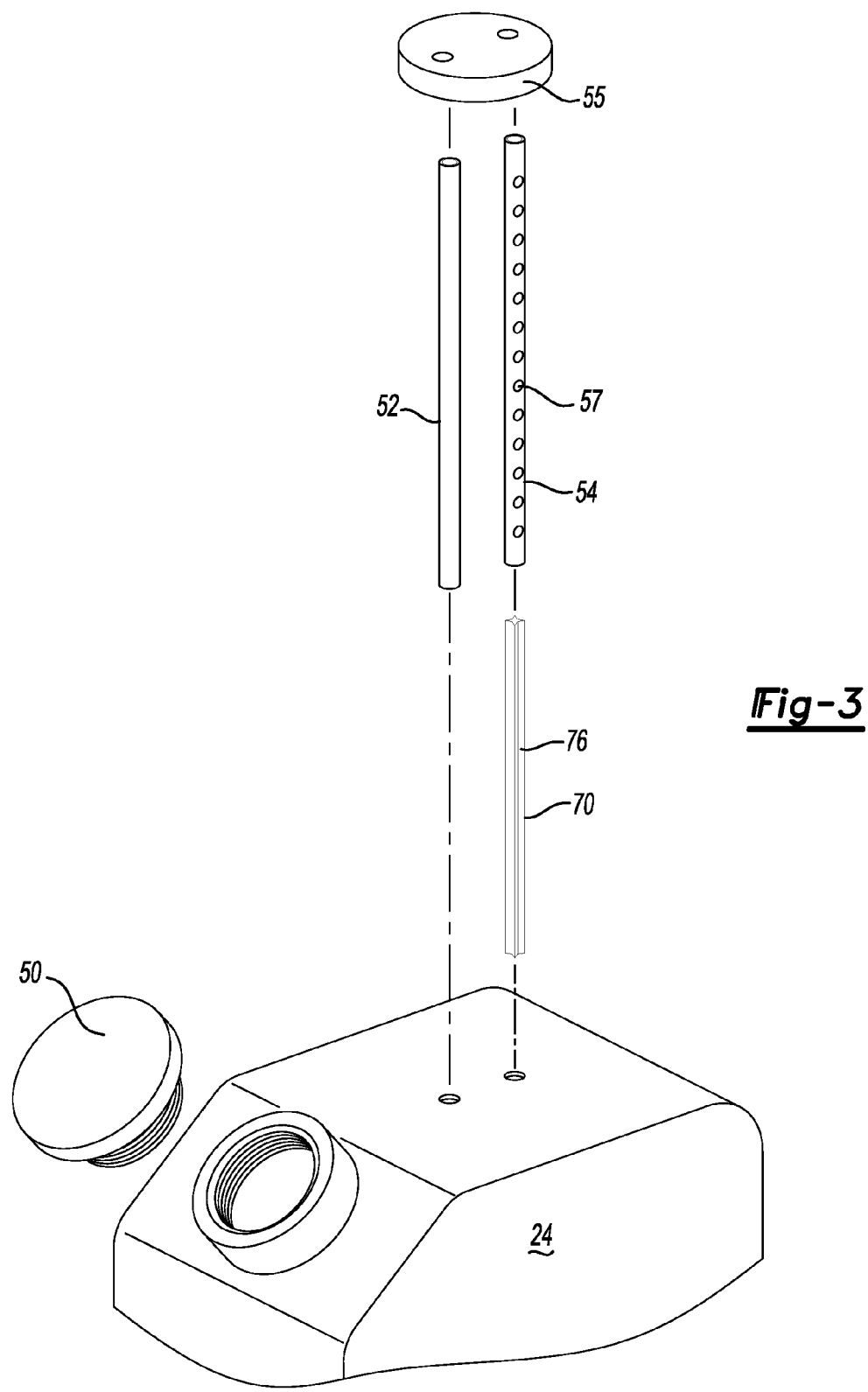
FIG. 3 is a partial exploded-perspective view of the reagent tank illustrated in FIG. 2.

To assist in preventing formation of bubbles as the exhaust treatment fluid 44 is cycled back to tank 24, a laminar flow device 70 may be disposed in discharge tube 54. Laminar flow device 70, as best illustrated in FIG. 3, may be an elongate member having a length substantially equal to that of discharge tube 54. Laminar flow device 70 is generally non-circular in cross-section, and has a diameter that is less than that of discharge tube 54 so that laminar flow device 70 may fit within discharge tube 54. The non-circular cross-section of laminar flow device allows for the presence of an air-gap 72 (FIG. 4) between laminar flow device 70 and an interior surface 74 of discharge tube 54.

The exhaust treatment fluid 44 will tend to flow along surfaces 76 of laminar flow device 70, while any air present in the return flow may travel in air-gap 72 located between laminar flow device 70 and an interior surface 74. As air travels in air-gap 72, it can be expelled into tank 24 through perforations 57 before travelling beneath level 62 of fluid 44. In this manner, bubbles are prevented, or at least substantially minimized, from occurring that can interfere with ultrasonic sensor device 58. It should be understood that although the above-noted exemplary embodiment described use of laminar flow device 70 in conjunction with discharge tube 54, the present disclosure should not be limited thereto. In this regard, the present disclosure contemplates configurations where laminar flow device 70 is used in lieu of discharge tube 54.

Figure 4:
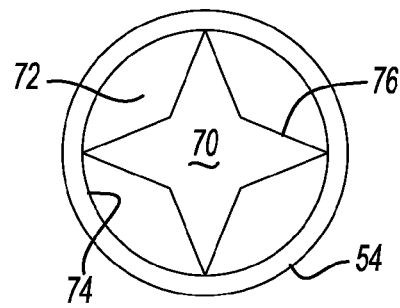
FIGS. 4-9 are cross-sectional views of a laminar flow device and discharge tube according to a principle of the present disclosure.
Figure 5:
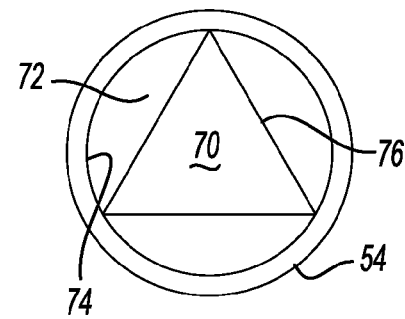
Figure 6:
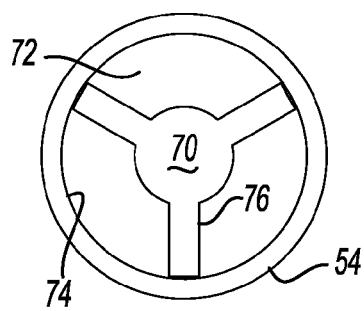
Figure 7:
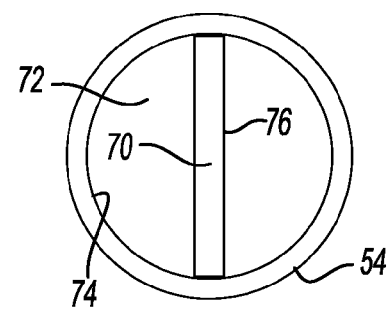
Figure 8:
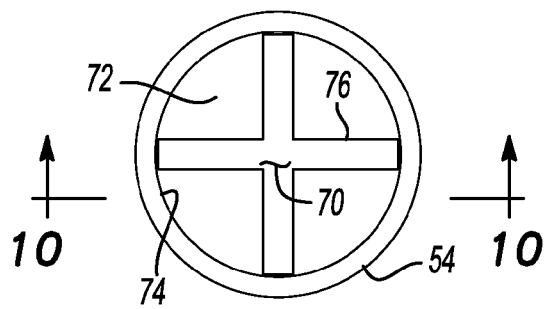
Figure 9:
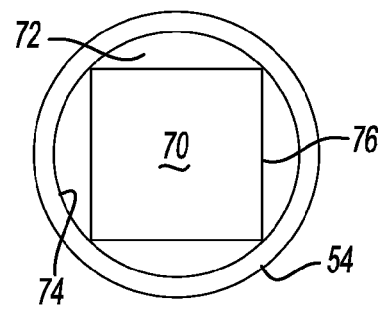

Although laminar flow device 70 is illustrated as including a star-shaped cross-section in FIG. 4, the present disclosure should not be limited thereto. Laminar flow device 70 can include any non-circular cross-section known to one skilled in the art. For example, FIG. 5 illustrates laminar flow device 70 having a triangular cross-section. FIG. 6 illustrates laminar flow device 70 having a Y-shaped cross-section. FIG. 7 illustrates a planar laminar flow device 70. FIG. 8 illustrates a laminar flow device 70 having a cross-shaped cross-section. FIG. 9 illustrates a laminar flow device 70 having a square-shaped cross-section.

Figure 10:
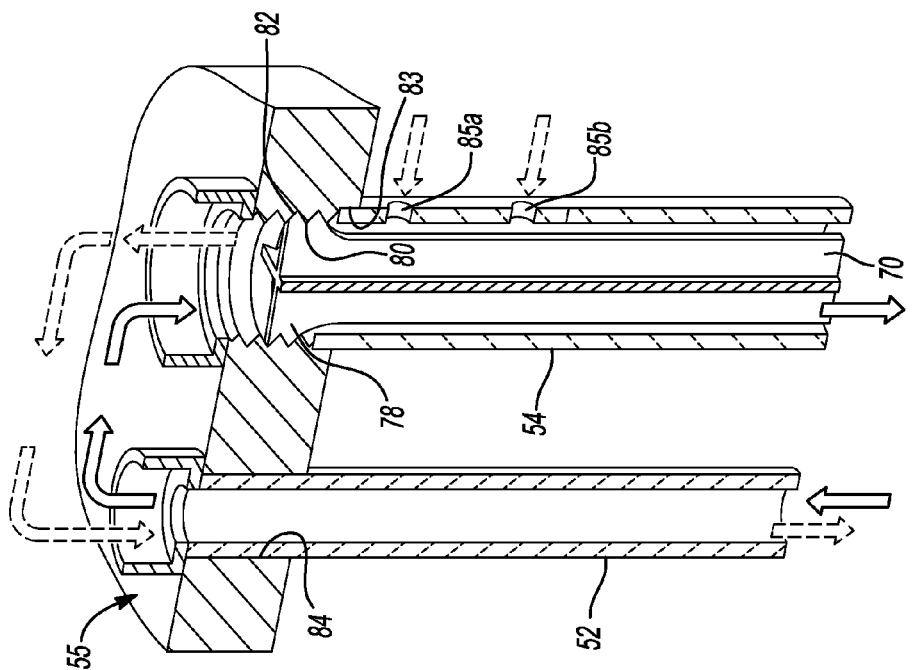
FIG. 10 is a cross-sectional perspective view of a mounting plate including a suction tube, discharge tube, and a laminar flow device according to a principle of the present disclosure.

As best shown in FIG. 10, laminar flow device 70 may include a threaded end 78. Threaded end 78 may correspond to a threading 80 formed in an aperture 82 of mounting plate 55. After laminar flow device 70 is threadingly engaged with mounting plate 55, discharge tube 54 may be slip fit about laminar flow device. In the arrangement depicted in FIG. 10, discharge tube 54 is press-fit within a counterbore 83 of mounting plate 55. In contrast to laminar flow device 70 being threadingly engaged with mounting plate 55, suction tube 52 can be press-fit within an aperture 84 of mounting plate. Alternatively, suction tube 52 and aperture 84 can each include threadings to secure suction tube 52 to aperture 84. In another configuration, laminar flow device 70 may be press-fit within discharge tube 54.

FIG. 10 also includes arrows having a solid outline depicting the flow of urea when the pump is operating to provide pressurized fluid to dosing module 22. Arrows having a dashed line representation indicate the flow of air through the system as pump 26 is operating in the purge mode to drive the unused exhaust treatment fluid 44 toward tank 24. A pair of apertures 85a, 85b, positioned near mounting plate 55 to provide a path for air flow from tank 24 to discharge tube 54.

Figure 11:
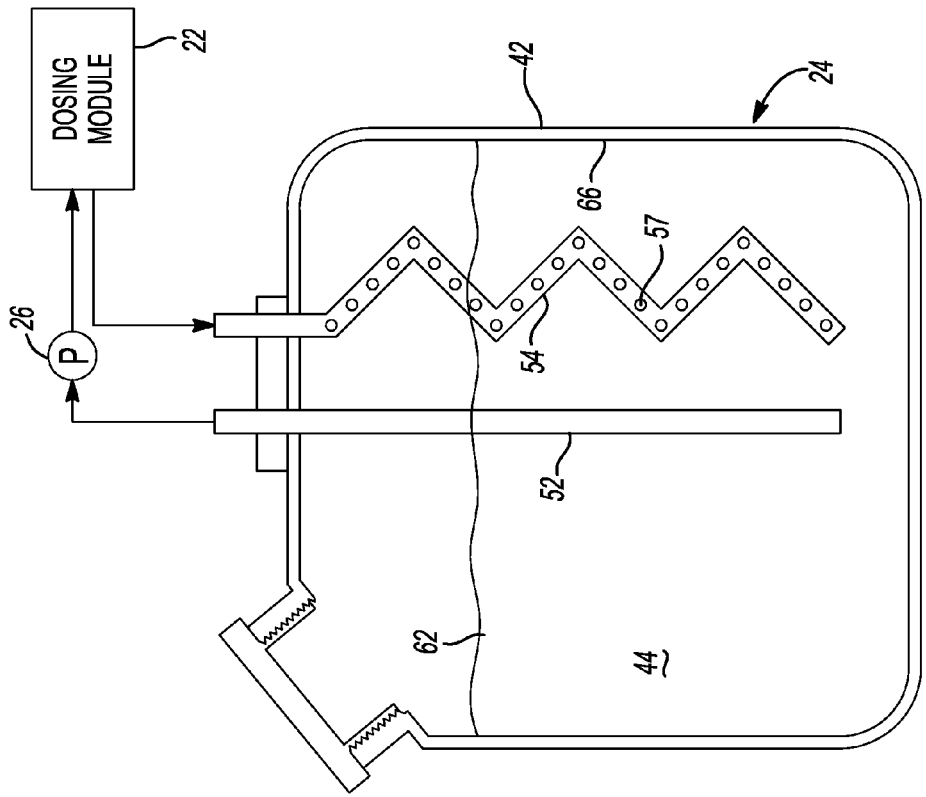
FIG. 11 is a cross-sectional view of a reagent tank according to a principle of the present disclosure.

Now referring to FIG. 11, another exemplary configuration of tank 24 is illustrated. Tank 24 includes a discharge tube 54 that is configured to allow air to escape from perforations 57 formed therein, while allowing returned exhaust treatment fluid to flow along interior surfaces thereof. In this regard, discharge tube 54 may be configured to have a zig-zag configuration. Although a zig-zag configuration is illustrated, it should be understood that discharge tube 54 can be helical or spiral without departing from the scope of the present application.

Figure 12:
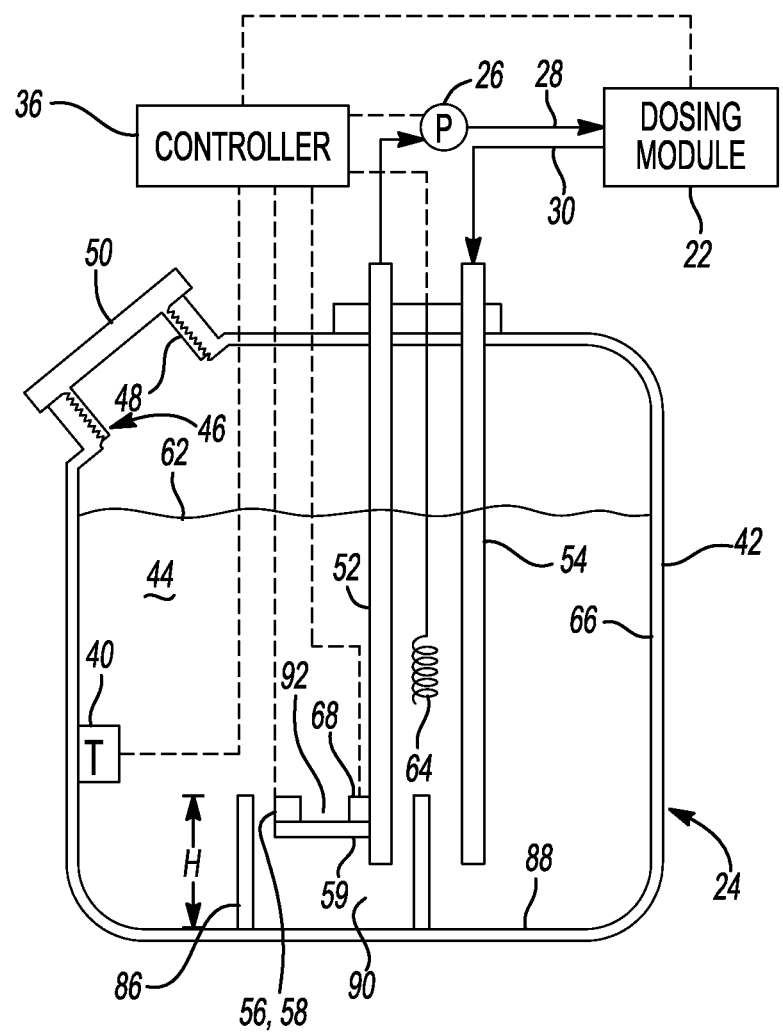
FIG. 12 is a cross-sectional view of a reagent tank according to a principle of the present disclosure.

In another exemplary embodiment of the present disclosure depicted in FIG. 12, a protective skirt or fence 86 may be disposed about ultrasonic sensor device 58 and concentration sensor 68. As noted above, concentration sensor 68 may be designed to emit ultrasonic waves 61 (FIG. 2) toward ultrasonic sensor device 58, which then reflects ultrasonic waves back toward concentration sensor 68. If bubbles produced by cycling the exhaust treatment fluid 44 back into tank 24 are present at locations proximate concentration sensor 68 and ultrasonic sensor device 58, an improper concentration reading may occur due to a change in density of the exhaust treatment fluid and unnecessary reflections of ultrasonic waves 61.

Protective skirt 86 may be fixed to a bottom surface 88 of tank 24, and peripherally surrounds ultrasonic sensor device 58 and concentration sensor 68. A region 90 defined by an interior of skirt 86 is thereby provided where ultrasonic sensor device 58 and concentration sensor 68 may be positioned. Skirt 86 has a height H that extends past a location where ultrasonic sensor device 58 and concentration sensor 68 are positioned. Bubbles, therefore, are prevented from entering region 90 and interfering with ultrasonic sensor device 58 and concentration sensor 68. It should be understood that although skirt 86 is illustrated as being fixed to bottom surface 88 of tank 24, the present disclosure should not be limited to such a configuration. In contrast, skirt 86 may be fixed to other members such as suction tube 52, or may be fixed to a support member 59, so long as bubbles are prevented from entering the space 92 between ultrasonic sensor device 58 and concentration sensor 68.

Although not explicitly shown in FIG. 12, it should be understood that discharge tube 54 may include laminar flow device 70 therein. That is, tank 24 can be configured to include each of skirt 86 and laminar flow device 70. It should also be appreciated that skirt 86 may include a plurality of perforations that allow exhaust treatment fluid 44 to enter region 90, while preventing bubbles from entering.

Figure 13:
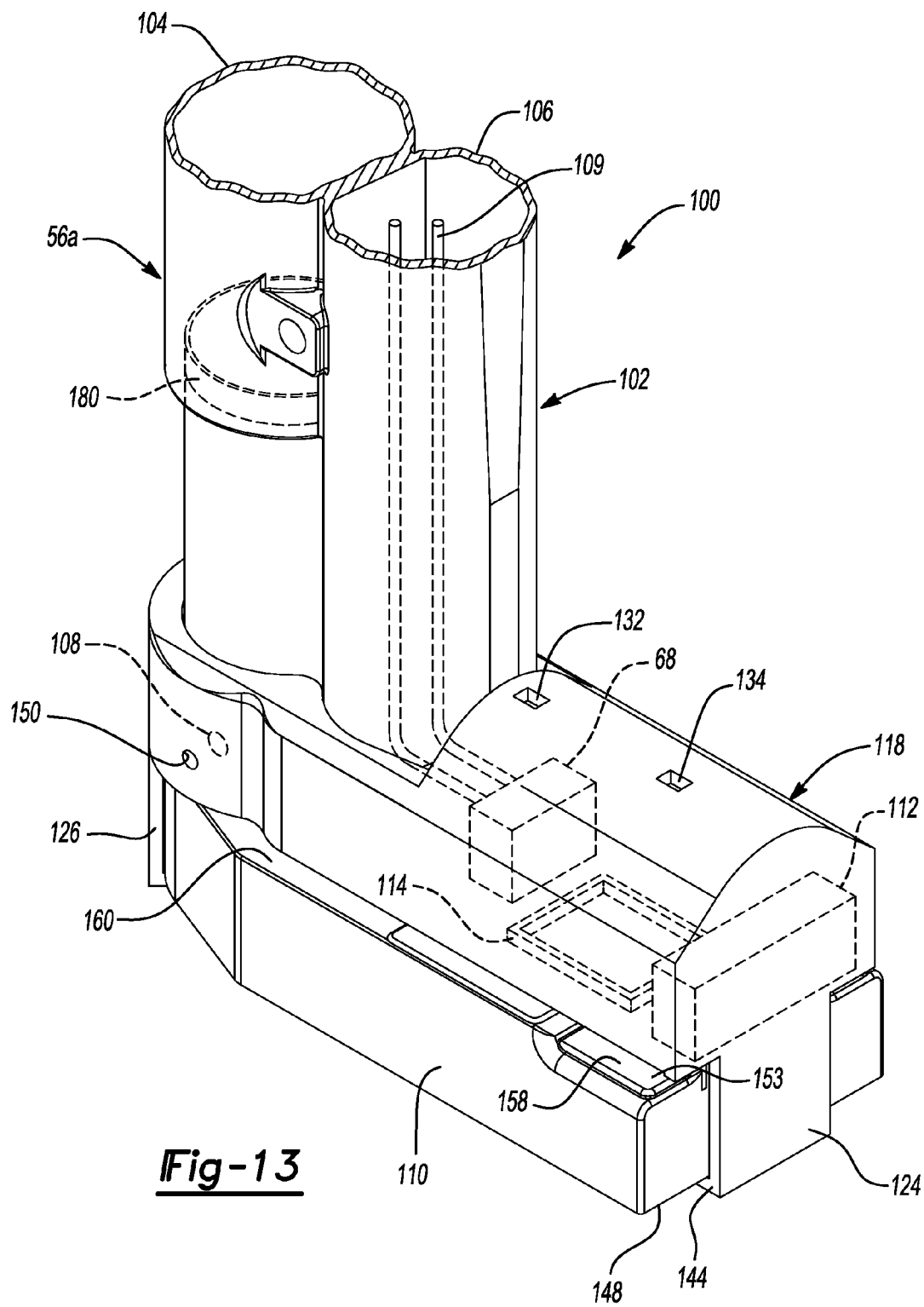
FIG. 13 is a fragmentary perspective view of a sensor assembly according another principle of the present disclosure.
Figure 14:
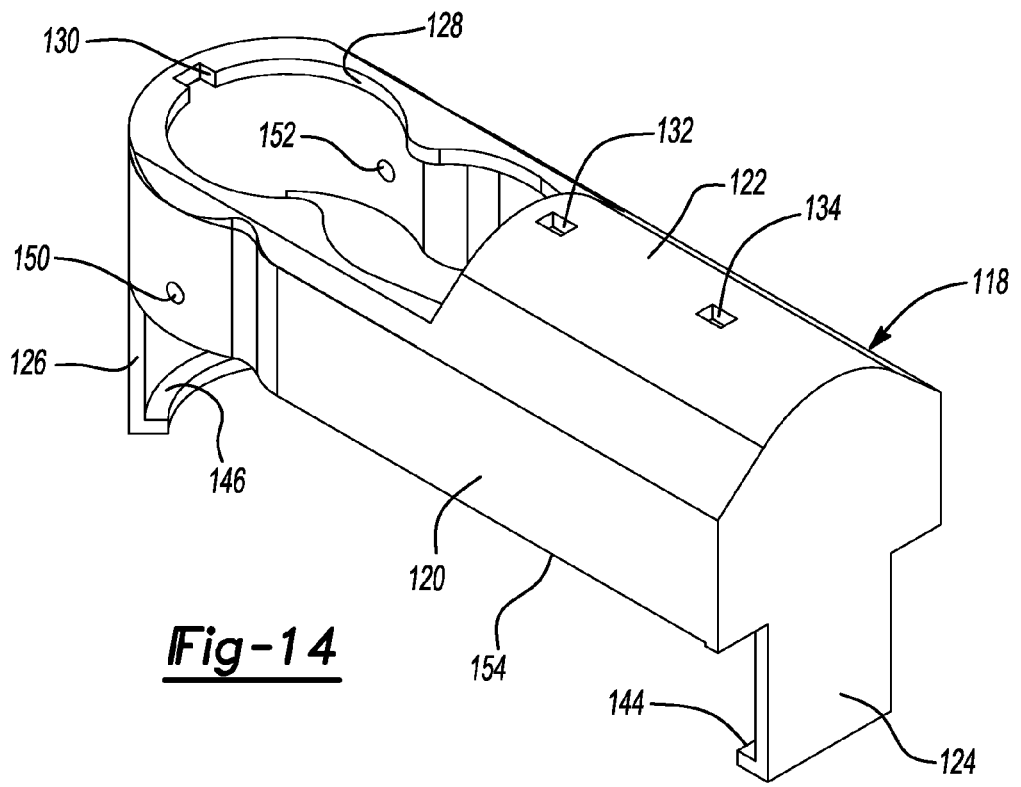
FIGS. 14 and 15 are perspective views of a skirt associated with the sensor assembly depicted in FIG. 13.
Figure 15:
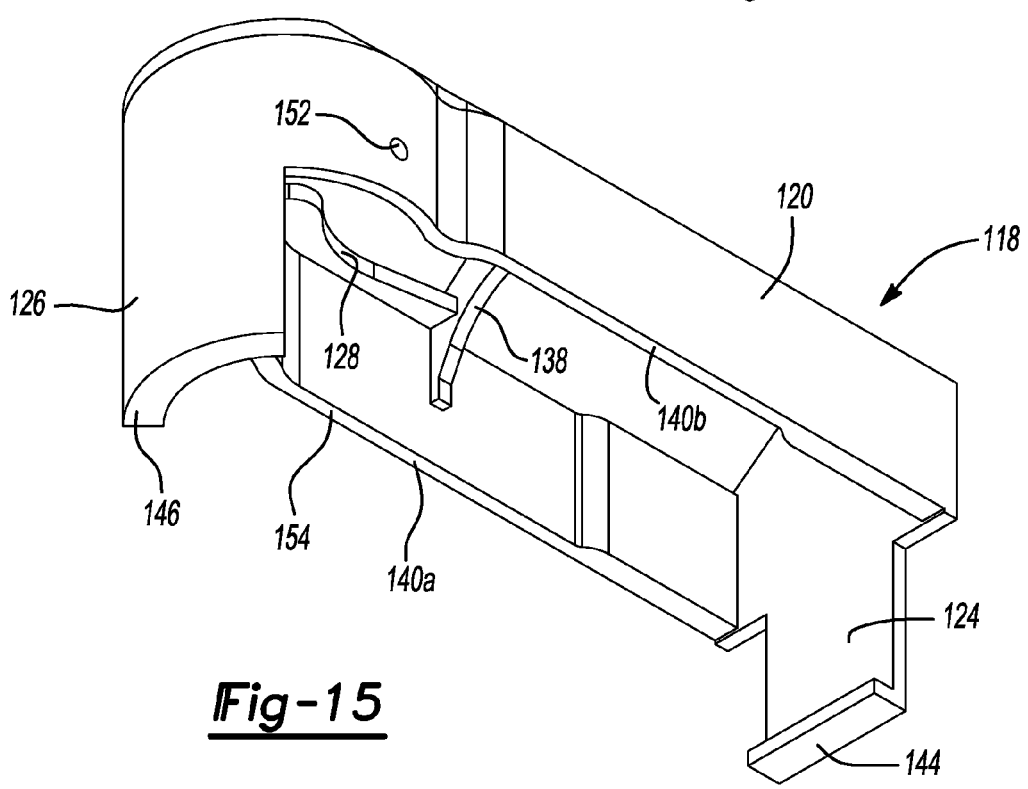

FIG. 13-15 depict a portion of a sensor assembly 100 that may be positioned within tank 24 as a structure separate from suction tube 52 and discharge tube 54. Sensor assembly 100 may be fixed to any number of components including mounting plate 55, tank 24, suction tube 52 and/or discharge tube 54. Sensor assembly 100 includes a body 102 including a first tube 104 extending substantially vertically and parallel to a second tube 106. Body 102 may be molded from a plastic material such that first tube 104 is integrally formed with second tube 106. A beam 110 may be constructed as a separate component and coupled to first tube 104 and second tube 106 or may be integrally formed with body 102.

When installed within tank 24, first tube 104 is in receipt of exhaust treatment fluid 44 via an aperture 108 extending through first tube 104. Second tube 106 is in receipt of wires 109 coupled to concentration sensor 68 and any other electrical element that may be coupled to beam 110. For example, it is contemplated that a temperature sensor 112 is fixed to beam 110. Another optional configuration may include a heating element 114 coupled to beam 110. Depending on the temperature of exhaust treatment fluid 44 sensed by temperature sensor 112, heating element 114 may be selectively energized. Wires 109 and possibly one or more controllers may be positioned within second tube 106.

A skirt 118 is removably coupled to body 102. Skirt 118 functions substantially similarly to skirt 86 previously described. Skirt 118 is preferably a one-piece molded plastic cover that may be coupled to body 102 in a snap-fit manner. Other forms of attachment including screws or a press fit are also within the scope of the present disclosure. Skirt 118 includes a continuous wall 120, a top 122, a first leg 124 and a second leg 126. A substantially figure-eight shaped aperture 128 extends through top 122 to allow first tube 104 and second tube 106 to pass therethrough. A notch 130 is located along an edge of aperture 128, sized and positioned to engage a protrusion extending from first tube 104 to restrict rotation of skirt 118 relative to body 102. Apertures 132, 134, extend through top 122 to allow air that may be positioned under skirt 118 to escape. A rib 138 connects side wall 120 with top 122 to provide skirt 118 with a predetermined stiffness. The predetermined stiffness is less than would be provided with a completely rigid structure. Accordingly, opposing portions of side wall 120 identified at reference numerals 140a, 140b, may flex relative to one another to accommodate for an increase in volume that occurs when exhaust treatment fluid 44 freezes within tank 24. A flexible skirt 118 is provided that will not fracture when forces are applied due to the freezing of the exhaust treatment fluid 44.

Skirt 118 is constructed from a flexible material that allows legs 124, 126 to be temporarily elastically deformed such that a first catch 144 and a second catch 146 are displaced from a free state position to pass by beam 110. Once the extent of beam 110 has been passed, legs 124, 126 elastically return to their free state orientation to position catch 144 and catch 146 adjacent to a retention surface 148 of beam 110.

Apertures 150, 152, extend through wall 120 and allow exhaust treatment fluid 44 to pass through skirt 118 and contact concentration sensor 68. Some of the fluid that passes through apertures 150, 152 may also enter first tube 104 via aperture 108. Another exhaust treatment fluid passage is provided in a space 153 between an edge 154 of side wall 120 and a surface 158 of beam 110. With this arrangement, a portion of edge 154 engages a surface 160 of beam 110 while another portion of edge 154 is spaced apart from beam 110 to allow a restricted flow of fluid 44 from the main body of tank 24 under skirt 118. Apertures 150, 152 and gap 153 are sized to allow fluid flow but restrict entry of bubbles under skirt 118. Apertures 132, 134 are also particularly sized to be relatively small to allow air that may be trapped under skirt 118 to exit while also minimizing ingress of bubbles. It should be appreciated that the snap fit coupling including inwardly extending catches 144, 146 is merely exemplary and other mechanisms for securing skirt 118 to any one of first tube 104, second tube 106 or beam 110 are within the scope of the present disclosure.

Figure 16:
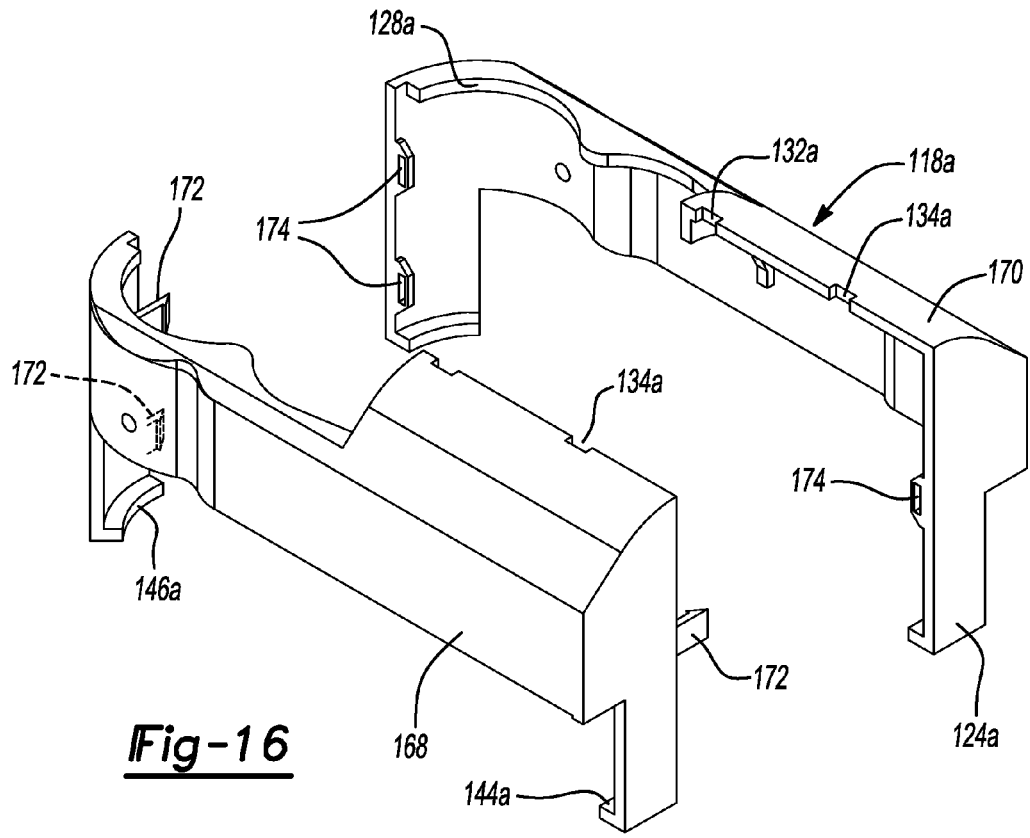
FIG. 16 is an exploded perspective view of an alternate skirt constructed in according with the teachings of the present disclosure.

FIG. 16 depicts an alternate skirt 118a. Skirt 118a is substantially similar to skirt 118 with the exception that a first shell or half 168 is separable from a second shell or half 170. A plurality of prongs 172 extend from first half 168. Prongs 172 are configured for snap-fit coupling to a plurality of receptacles 174 in second half 170. When prongs 172 are received within receptacles 174, first half 168 is fixed to second half 170. The remaining features of skirt 118a are substantially the same as skirt 118. The similar features are identified with like numerals including an "a" suffix. By configuring skirt 118a as a two piece assembly, manufacturing processes may be simplified with regard to forming first tube 104, second tube 106 and beam 110 as well as the interconnection of these components with skirt 118a.

The above-described exemplary embodiments assist in preventing bubbles generated during a purge/prime cycle from interfering with the level sensor device 58 and concentration sensor 68 as these sensors measure the level and concentration of the exhaust treatment fluid 44. If tank 24 is not provided with laminar flow device 70 or skirt 86, however, the generation of bubbles can interfere with these sensors 58 and 68. To further minimize interference with sensors 58 and 68, controller 36 may delay operation of sensors 58 and 68 for a predetermined period of time after the priming cycle has completed. For example, controller 36 may delay operation of sensors 58 and 68 for a period of time in the range of ten to twenty minutes. In such a case, any bubbles generated during the priming process may dissipate to an extent that will not substantially interfere with either ultrasonic sensor device 58 or concentration sensor 68.

Figure 17:
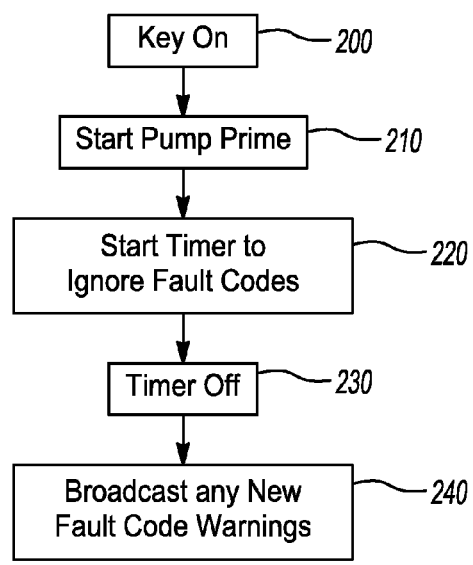
FIG. 17 is a flow chart illustrating a control scheme associated with the sensors of an exhaust treatment fluid system.

Another alternative to delaying operation of sensors 58 and 68 from the end of the priming cycle is to delay sensors 58 and 68 a predetermined period of time from the start of the priming cycle. For example, and as depicted in FIG. 17, the priming process can be controlled by controller 36 to begin at a "Key On" condition 200. Pump priming starts at block 210. A timer counts for a first predetermined period of time at block 220 (e.g., five minutes). Knowing that the priming process takes a certain amount of time to complete, the output from sensors 58 and 68 may be ignored during the first predetermined period of time until the timer turns off at block 230 (e.g., fifteen to twenty-five minutes). Once the set time has elapsed, control proceeds to block 240. Control assesses the outputs from the sensors 58, 68 and determines whether new fault codes based on the signals received from sensors 58, 68 should be broadcast per standard operation procedure.

Figure 18:
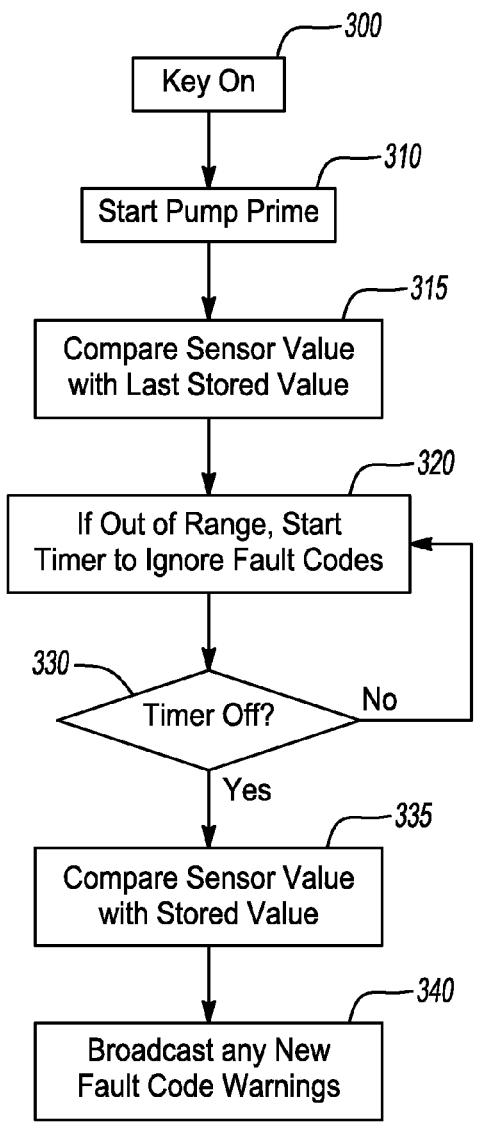
FIG. 18 is a flow chart illustrating an alternate control scheme for the exhaust treatment fluid system.

FIG. 18 provides a flow chart for an alternate control scheme substantially similar to the control previously described in relation to FIG. 17. Accordingly, similar elements will be identified with like reference numerals increased by 100. For example "Key On" block 300 is substantially similar to block 200. At block 315, a current value for one of the sensors previously described, such as concentration sensor 68 or ultrasonic sensor device 58, is compared with the last stored value from the same sensor. At block 320, control determines whether the difference between the recently acquired sensor value and the last stored value is beyond a predetermined range. If so, control starts the timer and ignores the sensor outputs as previously described. Once the timer is turned off, a recently acquired sensor value is compared with the previously stored value at block 335. At block 340, control determines whether a new fault code warning should be broadcast based on the comparison performed in block 335. The control scheme outlined in FIG. 18 may be applied to any one or more sensors within the exhaust treatment fluid storage tank as desired.

Figure 19:
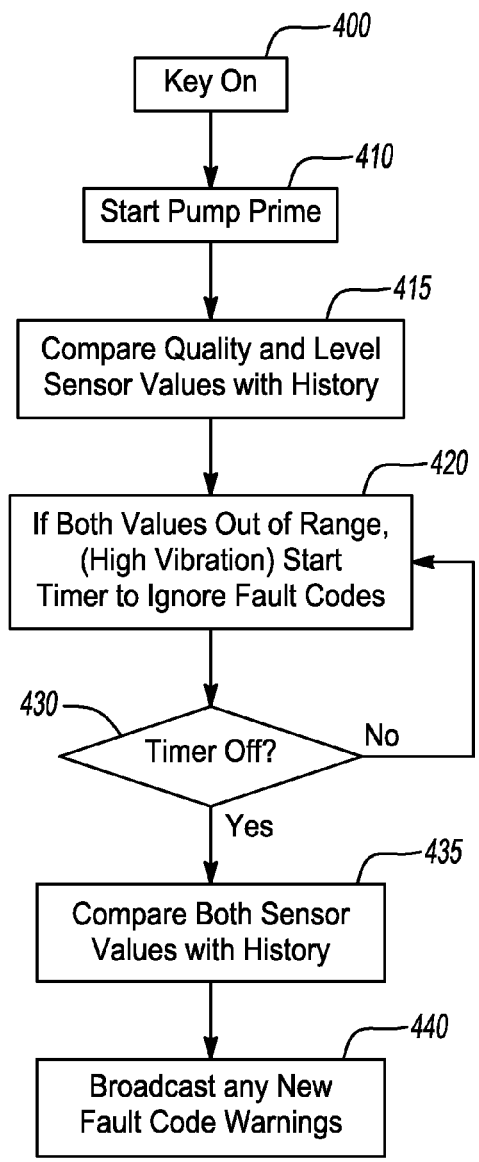
FIG. 19 is another flow chart depicting another alternate control scheme associated with the sensors of an exhaust treatment fluid system.

FIG. 19 provides a flow chart for another alternate control scheme that is substantially similar to the control described in relation to FIG. 18. Accordingly, similar elements will be identified with like reference numerals increased by 100. Block 415 differs from block 315 in that current values from both concentration sensor 68 and ultrasonic sensor device 58 are compared with historical values from each of these sensors. At block 420, control determines if both of the currently determined values are out of their respective ranges relative to the historical data. If so, a time period in which the fault codes are ignored begins. By implementing a control strategy that requires both of the sensors to have current readings that are out of range, the likelihood of broadcasting a false fault code warning is minimized. For example, if only the exhaust treatment fluid level sensor data is utilized in the control, a fault code warning may be issued based on the vehicle operator filling tank 24 with exhaust treatment fluid prior to "Key On" at block 400. Referring again to FIG. 19, once the timer is turned off at block 430, control compares the current sensor values for both the quality sensor and the level sensor with historical values at block 435. New fault code warnings are broadcast at block 440, if merited.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. For example, an alternate fluid level indicating device 56a may be coupled to sensor assembly 100. As shown in FIG. 13, fluid level indicating device 56a includes a float 180 positioned within first tube 104. Float 180 rests on the surface of the exhaust treatment fluid within first tube 104. As previously mentioned, fluid may enter first tube 104 via apertures 150 on skirt 118 and aperture 108 extending through the wall of first tube 104. Float 180 may be coupled to a switch (not shown) or a sensor indicating the position of float 180 within first tube 104. The switch or associated sensor is operable to output a signal indicative of the level of exhaust treatment fluid within tank 24. The same may also be varied in many ways. Such variations are not to be regarded as a departure from the disclosure, and all such modifications are intended to be included within the scope of the disclosure.

What is claimed is:

1. An exhaust treatment fluid system, comprising:
a tank housing for storing an exhaust treatment fluid;
a suction tube having an end positioned within the tank housing;
a first sensor positioned in the tank housing for determining at least one of a fluid level and a concentration of the exhaust treatment fluid; and
a skirt positioned in the tank housing to peripherally surround the first sensor, wherein the skirt includes a top wall and a peripheral wall, the top wall including an aperture to allow gas to escape from a volume of exhaust treatment fluid positioned between the skirt and the first sensor.

2. The exhaust treatment fluid system of claim 1, wherein the skirt is fixed to an interior wall of the tank housing.

3. The exhaust treatment fluid system of claim 1, wherein the first sensor includes an ultrasonic sensor.

4. The exhaust treatment fluid system of claim 1, further comprising a second sensor positioned in the tank housing, wherein the first sensor determines the fluid level and the second sensor determines the concentration of the exhaust treatment fluid.

5. The exhaust treatment fluid system of claim 4, wherein the second sensor is disposed proximate the first sensor.

6. The exhaust treatment fluid system of claim 5, wherein at least one of the first and second sensors is coupled to the suction tube.

7. The exhaust treatment fluid system of claim 5, wherein the skirt peripherally surrounds the first and second sensors.

8. The exhaust treatment fluid system of claim 1, further comprising an elongated laminar flow device secured to a discharge port of the tank housing such that exhaust treatment fluids flow along surfaces thereof as the exhaust treatment fluid is returned to the tank housing, wherein the laminar flow device includes a non-circular cross-section.

9. The exhaust treatment fluid system of claim 1, wherein the skirt is fixed to the first sensor.

10. The exhaust treatment fluid system of claim 1, wherein the skirt includes separate first and second shells, the first shell being coupled to the second shell.

11. The exhaust treatment fluid system of claim 1, further including a temperature sensor peripherally surrounded by the skirt.

12. An exhaust treatment fluid system, comprising:
a tank housing for storing an exhaust treatment fluid;
a suction tube having an end positioned within the tank housing;
a first sensor positioned in the tank housing for determining at least one of a fluid level and a concentration of the exhaust treatment fluid; and a skirt positioned in the tank housing to peripherally surround the first sensor, wherein the skirt includes a plastically deformable leg in a snap-fit coupling with the first sensor.

13. An exhaust treatment fluid system, comprising:
a tank housing for storing an exhaust treatment fluid;
a suction tube having an end positioned within the tank housing;
a first sensor positioned in the tank housing for determining at least one of a fluid level and a concentration of the exhaust treatment fluid; and
a skirt positioned in the tank housing to peripherally surround the first sensor, further including a support having a first end fixed to the tank housing and an unsupported second end, the first sensor being fixed to the support.

14. The exhaust treatment fluid system of claim 13, wherein the skirt is fixed to the support.

15. The exhaust treatment fluid system of claim 14, wherein the skirt includes a plastically deformable leg in a snap-fit coupling with the support.

16. The exhaust treatment fluid system of claim 13, wherein the support includes a first tube having an interior volume sealed from contact with the exhaust treatment fluid, the exhaust treatment fluid system including a wire extending through the first tube of the support and coupled to the first sensor.

17. The exhaust treatment fluid system of claim 16, wherein the support includes a second tube, the second tube having an interior volume containing the exhaust treatment fluid, the exhaust treatment fluid system further including a float and a sensor operable to output a signal indicative of a position of the float.

18. An exhaust treatment fluid system, comprising:
a tank housing for storing an exhaust treatment fluid, the tank housing being adapted to be fixed to a vehicle;
a suction tube positioned in the tank housing;
an injector including an inlet in fluid communication with the suction tube and an outlet;
a return line fluidly interconnecting the outlet of the injector and the tank housing;
a sensor positioned in the tank housing for determining at least one of a fluid level and a concentration of the exhaust fluid; and
a skirt positioned in the tank housing extending around the sensor to define a zone of exhaust treatment fluid that is shielded from another zone of exhaust treatment fluid within the tank housing, wherein the skirt includes an edge at least partially defining a gap, wherein the exhaust treatment fluid passes through the gap and bubbles within the fluid are restricted from passing through the gap based on a gap size.

19. The exhaust treatment fluid system of claim 18, wherein the skirt includes a top wall and a peripheral wall, the top wall including an aperture to allow gas to escape from a volume of exhaust treatment fluid positioned between the skirt and the sensor.

20. The exhaust treatment fluid system of claim 19, further including a support having a first end fixed to the tank housing and an unsupported second end, the sensor being fixed to the support.

21. The exhaust treatment fluid system of claim 20, wherein the skirt is fixed to the support.

22. The exhaust treatment fluid system of claim 21, wherein the skirt includes a plastically deformable leg in a snap-fit coupling with the support.

23. The exhaust treatment fluid system of claim 18, wherein the skirt includes a flexible material that is elastically deformable to withstand stress applied when the exhaust treatment fluid freezes and increases in volume.

24. The exhaust treatment fluid system of claim 18, further including a temperature sensor positioned within the zone of exhaust treatment fluid that is shielded from the another zone.

25. The exhaust treatment fluid system of claim 18, further including another sensor positioned within the tank housing and determining the other of the fluid level and the concentration of the exhaust treatment fluid.

26. The exhaust treatment fluid system of claim 25, wherein a controller compares a signal output from the sensor and a signal output from the another sensor with previously stored values and determines whether to start a timer during which the signals are ignored based on the comparison of the signals to the previously stored values.

27. The exhaust treatment fluid system of claim 26, wherein the signals from the sensor and the another sensor are ignored only if both signals are out of a desired range when compared to the previously stored values.

28. The exhaust treatment fluid system of claim 18, wherein the skirt includes separate first and second shells, the first shell being coupled to the second shell.

29. An exhaust treatment fluid system, comprising:
a tank housing for storing an exhaust treatment fluid, the tank housing being adapted to be fixed to a vehicle;
a suction tube positioned in the tank housing;
an injector including an inlet in fluid communication with the suction tube and an outlet;
a return line fluidly interconnecting the outlet of the injector and the tank housing;
a sensor positioned in the tank housing for determining at least one of a fluid level and a concentration of the exhaust fluid; and
a skirt positioned in the tank housing extending around the sensor to define a zone of exhaust treatment fluid that is shielded from another zone of exhaust treatment fluid within the tank housing, further including a controller determining whether to broadcast a fault code warning based on a signal output from the sensor, the controller ignoring the signal for a predetermined amount of time before determining whether to broadcast the fault code warning.

30. The exhaust treatment fluid system of claim 29, wherein the predetermined amount of time begins when a pump that pumps the exhaust treatment fluid begins to prime.

31. The exhaust treatment fluid system of claim 29, wherein the controller compares the signal output from the sensor with a previously stored value and determines whether to start ignoring the signal based on the comparison of the signal to the previously stored value.

* * * * *